United States Patent [19]

Sekine et al.

[11] Patent Number: 5,440,748
[45] Date of Patent: Aug. 8, 1995

[54] COMPUTER SYSTEM CAPABLE OF CONNECTING EXPANSION UNIT

[75] Inventors: Shigeru Sekine; Kazunori Yamaki; Nobutaka Nishigaki, all of Tokyo, Japan

[73] Assignee: Kabushiki Kaisha Toshiba, Kawasaki, Japan

[21] Appl. No.: 86,462

[22] Filed: Jul. 6, 1993

Related U.S. Application Data

[63] Continuation of Ser. No. 578,533, Sep. 7, 1990, abandoned.

[30] Foreign Application Priority Data

| Nov. 29, 1989 | [JP] | Japan | 1-307458 |
| Nov. 30, 1989 | [JP] | Japan | 1-311331 |
| Aug. 20, 1990 | [JP] | Japan | 2-218605 |
| Aug. 20, 1990 | [JP] | Japan | 2-218606 |

[51] Int. Cl.$^6$ ............................................. G06F 1/30
[52] U.S. Cl. ............................ 395/750; 364/DIG. 1; 364/273.1; 364/273.2; 364/273.3
[58] Field of Search ................ 395/750, 325, 275; 364/708, 707

[56] References Cited

U.S. PATENT DOCUMENTS

| 4,051,326 | 9/1977 | Badagnani et al. | 430/5 |
| 4,144,565 | 3/1979 | Bouknecht et al. | 395/325 |
| 4,204,249 | 5/1980 | Dye et al. | 395/750 |
| 4,312,035 | 1/1982 | Greene | 395/750 |
| 4,530,069 | 7/1985 | Desrochers | 395/275 |
| 4,593,349 | 6/1986 | Chase et al. | |
| 4,667,289 | 5/1987 | Yoshida et al. | 395/750 |
| 4,674,031 | 6/1987 | Siska, Jr. | 395/750 |
| 4,680,674 | 7/1987 | Moore | |
| 4,769,764 | 9/1988 | Levanon | |
| 4,782,355 | 11/1988 | Sakai et al. | 395/750 |
| 4,858,162 | 8/1989 | Kieffer et al. | 364/708 |
| 4,894,792 | 1/1990 | Mitchell et al. | 364/708 |
| 4,903,222 | 2/1990 | Carter et al. | 364/708 |
| 5,014,193 | 5/1991 | Garner et al. | 395/275 |
| 5,058,045 | 10/1991 | Ma | 364/708 |
| 5,097,439 | 3/1992 | Patriquin et al. | 395/425 |
| 5,157,769 | 10/1992 | Eppley et al. | 395/325 |
| 5,239,495 | 8/1993 | Nanno et al. | |

FOREIGN PATENT DOCUMENTS

| 0281999 | 9/1988 | European Pat. Off. |
| 0288292 | 10/1988 | European Pat. Off. |
| 0301100 | 2/1989 | European Pat. Off. |
| 2105115 | 3/1983 | United Kingdom |
| 2153567 | 8/1985 | United Kingdom |
| WO86/00154 | 1/1986 | WIPO |

OTHER PUBLICATIONS

Small Business Computer News, vol. 16, No. 1, Jan. 1989, pp. 7-21, J. M. Weeks, "A Reivew of Three 286--Based Laptops".

IBM Technical Disclosure Bulletin, vol. 26, No. 10A, Mar. 1984, pp. 5147-5158, H. C. Lin, et al. "Extended Data Bus with Direction and Enable Control Features".

*Primary Examiner*—Jack B. Harvey
*Assistant Examiner*—Ayaz R. Sheikh
*Attorney, Agent, or Firm*—Oblon, Spivak, McClelland, Maier, & Neustadt

[57] ABSTRACT

In a computer system, when an expansion unit is connected to a computer main body by an interface card, power supply control and I/O port selection are performed at the start of the computer system. In the power supply control, when an expansion power supply of the expansion unit is turned on, a first voltage is supplied to a main power supply of the computer main body. When the main power supply is turned on, main voltages are supplied to computer main body elements from the main power supply in response to the main voltage, and a second voltage is supplied to the expansion power supply through the interface. In response to the second voltage, expansion voltages is supplied to expansion unit elements, and an interface voltage is supplied to the interface. After the power supply control is completed, the I/O port selection is performed. The port addresses of the I/O ports in the computer main body are compared with the port addresses of the I/O ports in the expansion unit. If both port addresses coincide with each other, the I/O ports in the computer main body are disabled, and the I/O ports in the expansion unit are enabled.

17 Claims, 8 Drawing Sheets

COMPUTER SYSTEM CAPABLE OF CONNECTING EXPANSION UNIT

This application is a Continuation of application Ser. No. 07/578,533, filed on Sep. 7, 1990, now abandoned.

BACKGROUND OF THE INVENTION

1. Field of the Invention

The present invention relates to a computer capable of connecting an expansion unit.

2. Description of the Related Art

Various types of expansion units have recently been developed to expand the functions of personal computers such as laptop computers. When a computer main body is connected to such an expansion unit, and power supplies are subsequently turned on in accordance with a predetermined sequence, a computer system constituted by the computer main body and the expansion unit is started.

The sequence of turning on the power supplies the expansion unit and the computer main body connected thereto is complicated for an operator. If the power supplies are turned of in an incorrect sequence, an operation error or a circuit breakdown may be caused.

In a conventional computer system, a connecting state of an external I/O (input/output) device is checked by an initial diagnosis test (IRT test). For example, a register capable of read/write operations is arranged at an I/O port of each I/O interface, and data representing a connecting state of an I/O device is stored in the register in advance. In this case, when a connecting state of an I/O device is to be checked, the data in this register is read out. The I/O device, e.g., a printer, connected to the I/O port is recognized on the basis of the readout data.

In the above-described arrangement, no identical I/O port addresses should be set on the same bus. However, the port addresses of I/O devices are constant. Therefore, for example, the computer main body cannot be connected to the expansion slot of an expansion unit including an I/O interface which has the same I/O port address as that of the I/O interface of the computer main body because of the coincidence of the port addresses. Accordingly, if identical I/O port addresses are present on the same bus, an error occurs in the above-mentioned IRT test. Even if no error occurs in the IRT test, collision of data on the data bus is caused during execution of an application program. If an expansion unit is used by changing its port address, an application program cannot be operated.

Under the circumstances, a strong demand has arisen for a computer system which can be efficiently operated when a computer main body is connected to an expansion unit.

SUMMARY OF THE INVENTION

It is an object of the present invention to provide a computer system capable of connecting an expansion unit.

According to first aspect of the present invention, there is provided a computer system comprising:

a computer main body having a plurality of main elements;

an expansion unit having a plurality of expansion elements;

interface means for connecting the expansion unit to the computer main body;

main power supply means for supplying first element voltages to the main elements when the main power supply means is turned on and when a first power supply voltage is received by the main power supply means, and supplying a second power supply voltage when the first element voltages are supplied to the main elements; and expansion power supply means for supplying the first power supply voltage to the main power supply means when the expansion power supply means is turned on, supplying second element voltages to the expansion elements when the second power supply voltage is received by the expansion power supply means, and supplying an interface voltage to the interface means when the second element voltages are supplied to the expansion elements.

According to second aspect of the present invention, there is provided a computer system comprising:

a computer main body having a plurality of main input/output ports;

an expansion unit having a plurality of expansion input/output ports;

determining means for determining whether or not main port addresses of the main input/output ports coincide with expansion port addresses of the expansion input/output ports when the expansion unit is connected to the computer main body; and port control means for disabling the main input/output ports in accordance with a determination result.

According to third aspect of the present invention, there is provided a computer system comprising:

a computer main body having a plurality of main input/output ports;

an expansion unit having a plurality of expansion input/output ports;

register means for storing identification data for identifying expansion input/output ports; and port control means for enabling/disabling the main input/output ports in accordance with the stored identification data when the expansion unit is connected to the computer main body.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be described below with reference to the accompanying drawings.

Figure 1A:
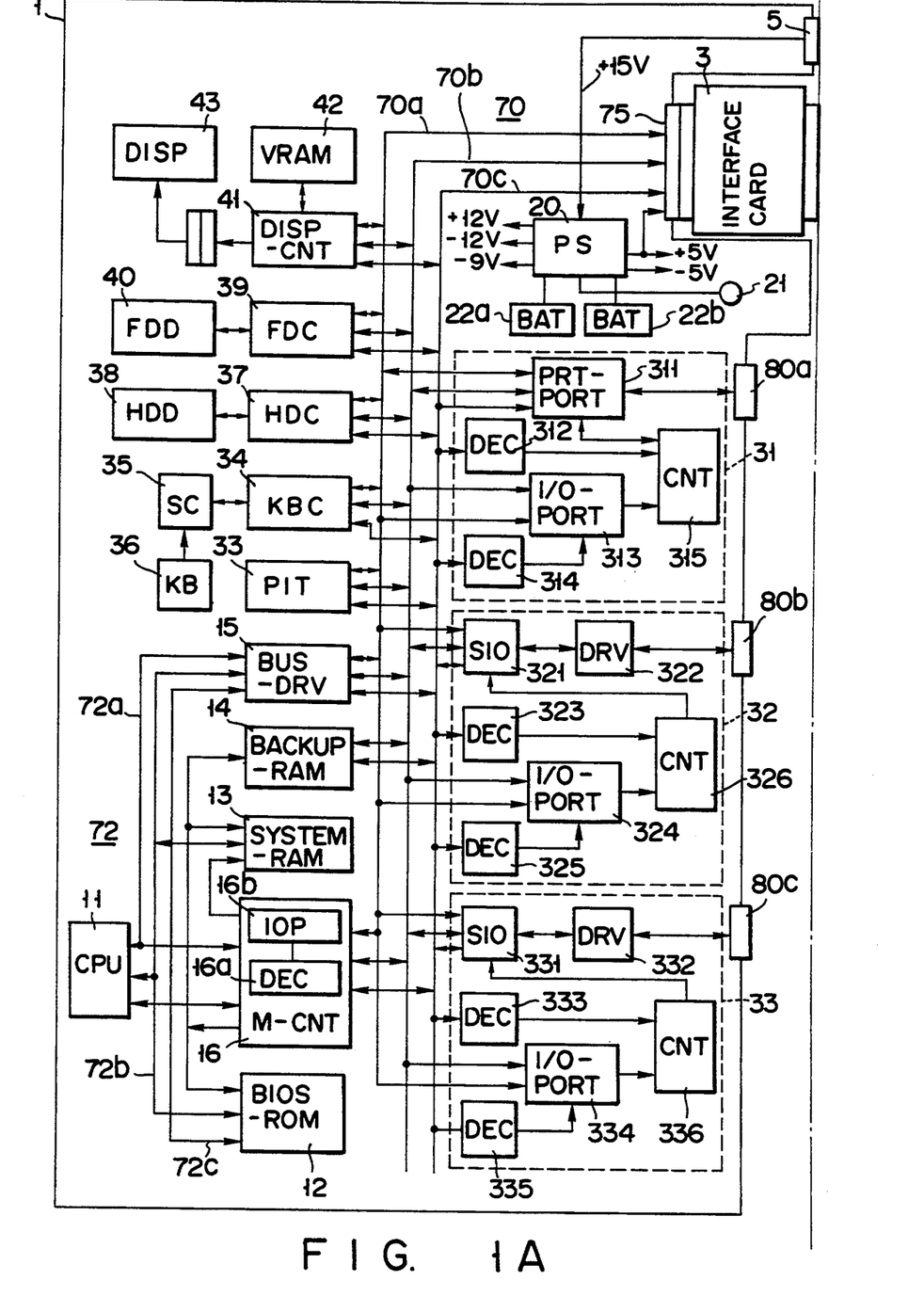
FIGS. 1A and 1B are block diagrams showing an arrangement of a computer system according to an embodiment of the present invention.
Figure 1B:
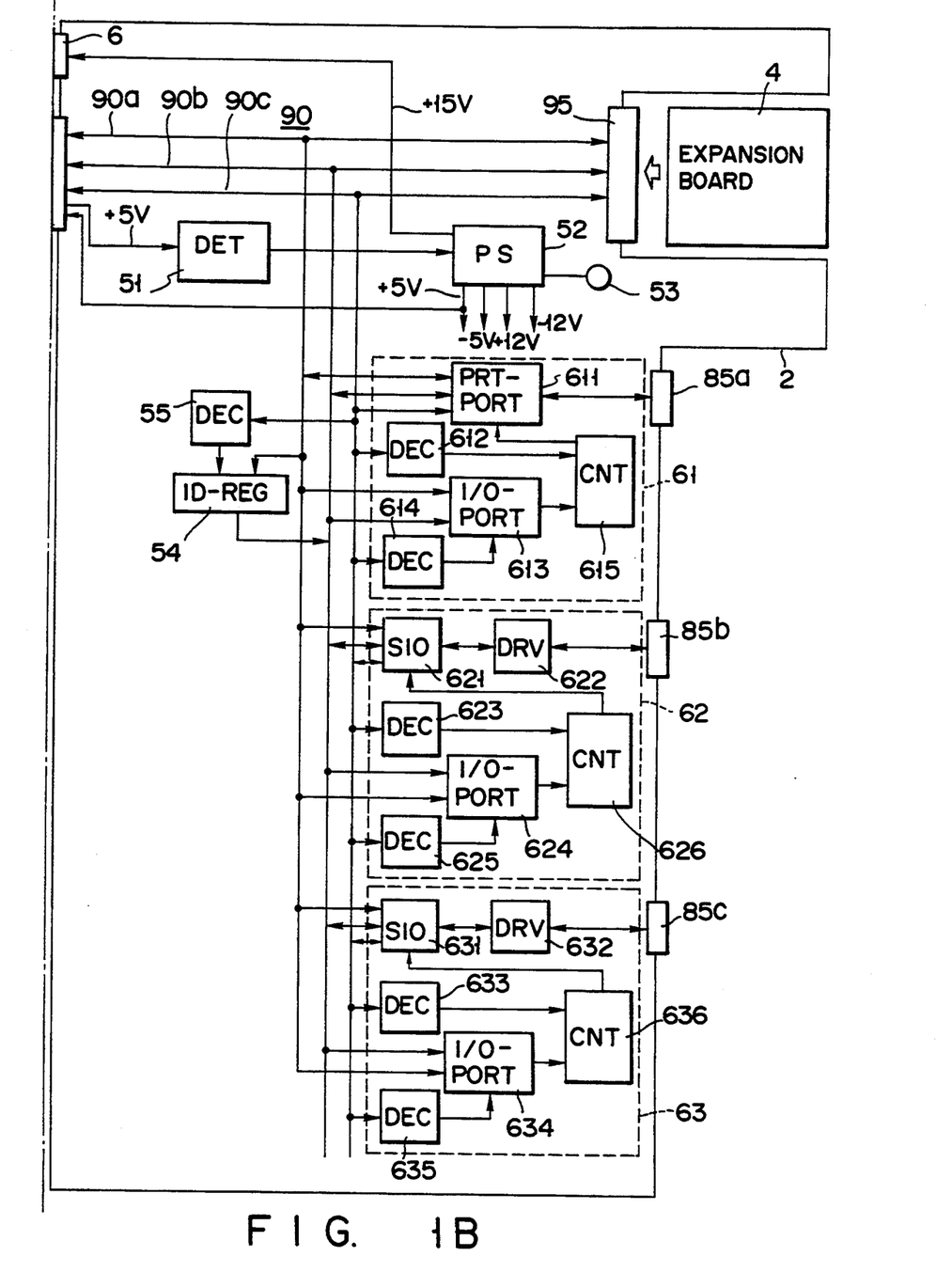

Referring to FIG. 1, a computer system of this embodiment comprises a computer main body 1 of a laptop type which can be driven by a battery, an expansion unit 2 which can be connected to the computer main body 1, an interface card 3, and an expansion board 4.

When the expansion unit 2 is to be used, the interface card 3 is connected to an expansion bus connector 75 of the computer main body 1. The expansion unit 2 is then connected to the computer main body 1 through the interface card 3.

The expansion board 4 is selectively connected to an expansion bus connector 95 of the expansion unit 2.

In the computer main body 1, the respective components are directly or indirectly connected to each other through a system bus 70 (a control bus 70a, a data bus 70b, and an address bus 70c). The respective components will be described below.

A BIOS (basis input/output system)-ROM (read only memory) 12 stores programs and the like for controlling selection of I/O (input/output) interfaces to be used. When the expansion unit 2 is to be connected, the I/O interface of the expansion unit 2 is used in place of the I/O interface of the computer main body 1, as will be described later.

A system RAM (random access memory) 13 stores programs and data to be processed.

A backup RAM 14 stores data and the like when resume processing is performed. Note that while the system power supply is turned off, power is supplied to the backup RAM 14 in order to back up stored data and the like.

A bus driver (BUS-DRV) 15 is arranged between a CPU bus 72 (a control bus 72a, a data bus 72b, and an address bus 72c) and the system bus 70 so as to perform data transmission/reception therebetween.

A memory controller (M-CNT) 16 performs access control with respect to the ROM 12 and the RAMs 13 and 14 under the control of the CPU 11. Note that the memory controller 16 includes an address decoder (DEC) 16a for outputting a selection signal to the RAM 14 upon detection of an address designating the RAM 14, and an input/output port (IOP) 16b for performing enable/disable control of the address decoder 16a.

A power supply (PS) 20 applies DC operating voltages (+12 V, −12 V, −9 V, +5 V, and −5 V) to the respective components by using a DC voltage (+15 V) from a power supply adapter (not shown) or the expansion unit 2 connected to a power supply connector 5. In addition, a voltage (+5 V) from the power supply 20 is applied as an operation check signal to a power supply (PS) 52 of the expansion unit 2 through the interface card 3.

That is, if the expansion unit 2 is not connected to the computer main body 1, the power supply connector 5 is connected to the power supply adapter, and a DC output voltage (+15 V) from the power supply adapter is applied to the power supply 20. If the expansion unit 2 is connected, the power supply connector 5 is connected to a power supply connector 6 of the expansion unit 2, and DC power (+15 V) is supplied from the power supply 52 to the power supply 20. In this case, a DC output voltage (+15 V) is applied from the power supply adapter to the power supply 52. A switch 21 is used to turn on and off the power supply 20.

Batteries (BATs) 22a and 22b can be separately detached and serve to supply power to the power supply 20.

A printer interface 31 is arranged between the system bus 70 and a printer connector 80a so as to transmit/receive data to/from a device such as a printer connected to the printer connector 80a. Note that the printer interface 31 includes a printer port (PRT-PORT) 311 for transmitting/receiving data to/from a device such as a printer connected to the printer connector 80a, an address decoder (DEC) 312 for detecting the port address of the printer port 311, an input/output port (I/O-PORT) 313 for outputting data for controlling the printer port 311, an address decoder (DEC) 314 for detecting the port address of the I/O port 313, and a controller (CNT) 315 for controlling the printer port 311 in accordance with data output from the I/O port 313 and a selection signal supplied from the address decoder 312 upon detection of a port address.

A first RS-232C interface 32 is arranged between the system bus 70 and an RS-232C connector 80b so as to transmit/receive data and the like to/from a device connected to the RS-232C connector 80b. Note that the RS-232C interface 32 includes a serial input/output port (SIO) 321 for transmitting/receiving data and the like to/from a device connected to the RS-232C connector 80b, a driver (DRV) 322, an address decoder (DEC) 323 for detecting the port address of the serial I/O port 321, an input/output port (I/O-PORT) 324 for outputting data for controlling the serial I/O port 321, an address decoder (DEC) 325 for detecting the port address of the I/O port 324, and a controller (CNT) 326 for controlling the serial I/O port 321 in accordance with data output from the I/O port 324 and a selection signal supplied from the address decoder 323 upon detection of a port address.

A second RS-232C interface 33 is arranged between the system bus 70 and the RS-232C connector 80c so as to transmit/receive data and the like to/from a device connected to the RS-323C connector 80c. Note that the second RS-232C interface 33 has the same arrangement as that of the first RS-232C interface 32. That is, the second RS-232C interface 33 includes a serial input/output port (SIO) 331, a driver (DRV) 332, an address decoder (DEC) 333, an input/output port (I/O-PORT) 334, an address decoder (DEC) 335, and a controller (CNT) 336.

In addition, the computer main body 1 includes a programmable interval timer (PIT) 33 which can be set by a program, a keyboard controller (KBC) 34, a scan controller (SC) 35, a keyboard (KB) 36, a hard disk controller (HDC) 37, a hard disk drive (HDD) 38, a floppy disk controller (FDC) 39, a floppy disk drive (FDD) 40, a display controller (DISP-CNT) 41, a video RAM (VRAM) 42 capable of data backup during a power-OFF period, and a display unit (DISP) 43 constituted by a plasma display or the like.

In the expansion unit 2, the respective components are directly or indirectly connected to each other through a system bus 90 (a control bus 90a, a data bus 90b, and an address bus 90c). Note that the system bus 90 is connected to the system bus 70 of the computer main body 1 through the interface card 3. The respective components of the expansion unit 2 will be described below.

Upon reception of an operation check signal (+5 V) from the power supply 20 of the computer main body 1 through the interface card 3, a voltage detector (DET) 51 outputs a power supply enable signal to the power supply (PS) 52.

Figure 2:
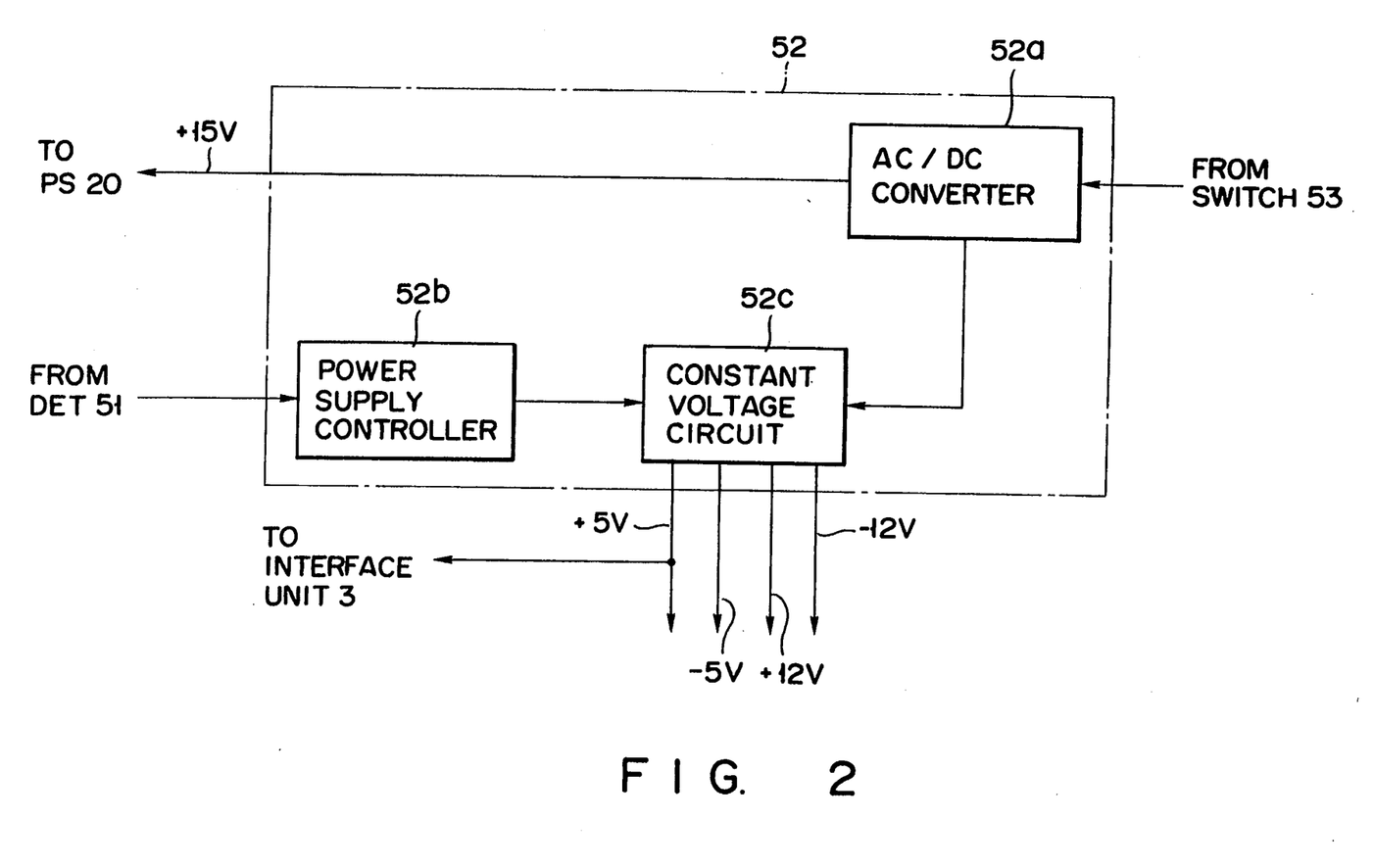
FIG. 2 is a block diagram showing an arrangement of a power supply of an expansion unit in the computer system.

The power supply 52 comprises an AC/DC converter 52a, a power supply controller 52b, and a constant voltage circuit 52c, as shown in FIG. 2.

The AC/DC converter 52a rectifies/smooths a commercial AC voltage from the power supply adapter and generates a DC voltage (+15 V, +12 V, −12 V, +5 V, and −5 v).

The constant voltage circuit 52c supplies DC operating voltages (+12 V, −12 V, +5 V, and −5 V) from the AC/DC converter 52a to the respective components of the expansion unit 2, and supplies a DC voltage (+15 V) to the power supply 20 of the computer main body 1.

The power supply controller 52b controls supply of DC voltages from the constant voltage circuit 52c. More specifically, no DC operating voltages (+12 V, −12 V, +5 V, and −5 V) are supplied to the respective components of the expansion unit 2 until a power supply enable signal from the voltage detector (DET) 51 is received.

A switch 53 is used to turn on and off the power supply 52 of the expansion unit 2.

An ID register (ID-REG) 54 is connected to the system bus 90 of the expansion unit 2 so as to store unit ID data inherent in the expansion unit 2. A port address assigned to the I/O port of each I/O interface of the expansion unit 2 can be recognized by referring to this unit ID data.

An address decoder (DEC) 55 performs address detection with respect to the ID register 54.

A printer interface 61 is arranged between the system bus 90 and a printer connector 85a so as to transmit/receive data and the like to/from a device such as a printer connected to the printer connector 85a. Note that the printer interface 61 has the same arrangement as that of the printer interface 31 and hence includes a printer port (PRT-PORT) 611, an address decoder (DEC) 612, an input/output port (I/O-PORT) 613, an address decoder (DEC) 614, and a controller (CNT) 615.

A first RS-232C interface 62 is arranged between the system bus 90 and an RS-232C connector 85b so as to transmit/receive data and the like to/from a device connected to the RS-232C connector 85b. In addition, a second RS-232C interface 63 is arranged between the system bus 90 and an RS-232C connector 85c so as to transmit/receive data and the like to/from a device connected to the RS-232C connector 85c. Note that the RS-232C interfaces 62 and 63 have the same arrangement as that of the RS-232C interfaces 32 and 33 and hence respectively include serial input/output ports (SIOs) 621 and 631, drivers (DRVs) 622 and 632, address decoders (DECs) 623 and 633, input/output ports (I/O-PORTs) 624 and 634, address decoders (DECs) 625 and 635, and controllers (CNTs) 626 and 636.

Figure 3:
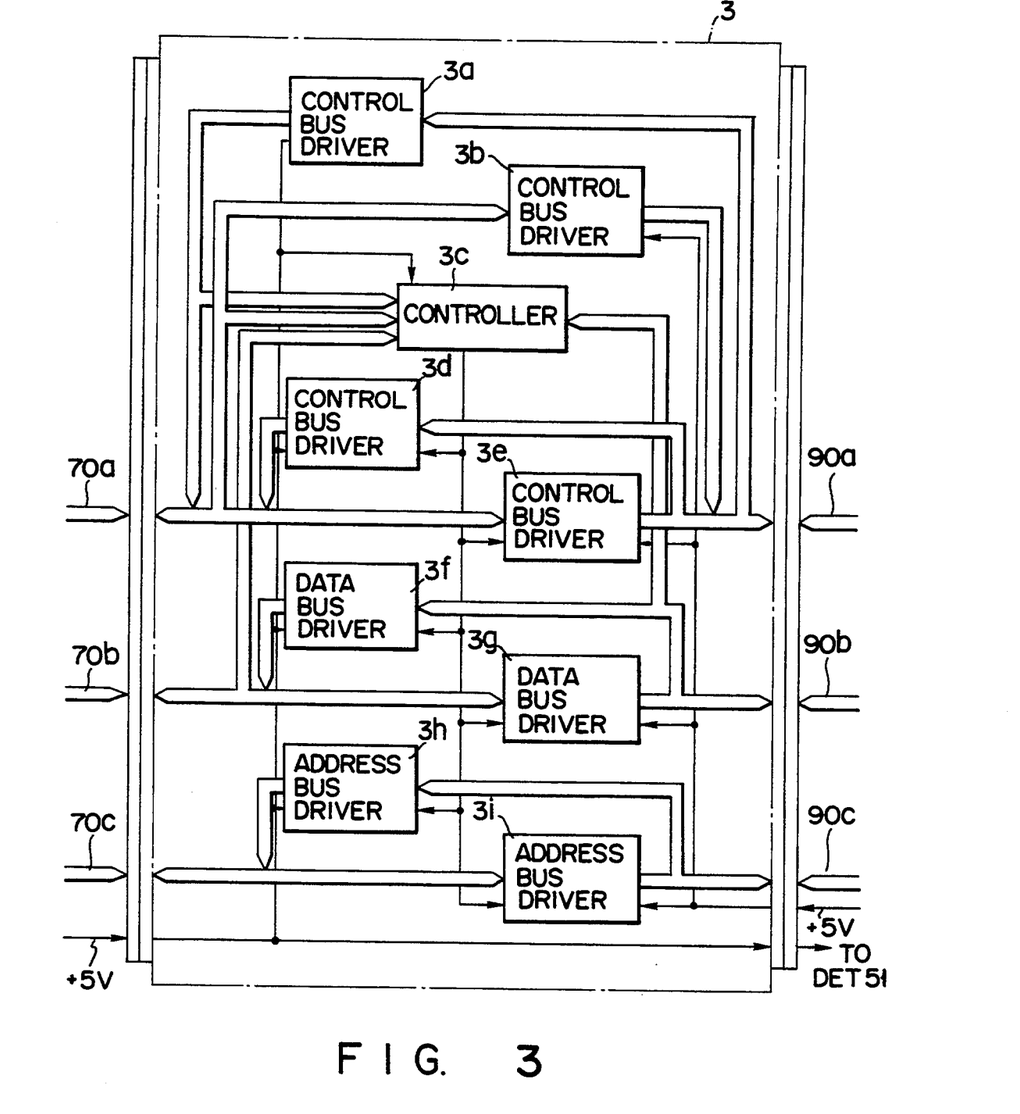
FIG. 3 is a block diagram showing an arrangement of an interface card in the computer system.

Referring to FIG. 3, the interface card 3 is used as an interface between the system bus 70 of the computer main body 1 and the system bus 90 of the expansion unit 2.

An address bus driver 3i transfers address data on the address bus 70c of the computer main body 1 to the address bus 90c of the expansion unit 2. A data bus driver 3g transfers data on the data bus 70b to the data bus 90b. Control bus drivers 3b and 3e transfer control data on the control bus 70a to the control bus 90a. Note that the bus drivers 3b, 3e, 3g, and 3i are enabled by a voltage (+5 V) from the power supply 52.

An address bus driver 3h transfers address data on the address bus 90c of the expansion unit 2 to the address bus 70c of the computer main body 1. A data bus driver 3f transfers data on the data bus 90b to the data bus 70b. Control bus drivers 3a and 3d transfer control data on the control bus 90a to the control bus 70a. Note that the bus drivers 3a, 3d, 3f, and 3h are enabled by a voltage (+5 V) from the power supply 20.

A controller 3c controls driving of the bus drivers 3a, 3b, 3d to 3i. Note that the controller 3c is enabled by a voltage (+5 V) from the power supply 20.

As described above, the bus drivers for transferring data from the computer main body 1 to the expansion unit 2 are not enabled until operating voltages are applied from the power supply 52 of the expansion unit 2 to the respective components, and the expansion unit 2 is in an operative state. This prevents breakdown of the components of the expansion unit 2 when data is transferred from the computer main body 1 to the expansion unit 2 before the expansion unit 2 is in an operative state.

An operation of the system of this embodiment will be described below. In this case, after the expansion unit 2 is connected to the computer main body 1, the power supplies are subsequently turned on.

After the interface card 3 is connected to the expansion bus connector 75 of the computer main body 1, the expansion unit 2 is connected to the computer main body 1 through the interface card 3. The power supply connector 6 of the expansion unit 2 is connected to the power supply connector 5 of the computer main body 1. In addition, the power supply adapter is connected to the expansion unit 2.

If the switch 53 of the expansion unit 2 is turned on after completion of connection of the expansion unit 2, a voltage (+15 V) is applied from the power supply 52 to the computer main body 1. In this case, no operating voltages (+12 V, −12 V, +5 V, and −5 V) are applied to the respective components of the expansion unit 2.

If the switch 21 is turned on at this time, operating voltages (+12 V, −12 V, −9 V, +5 V, and −5 V) are applied from the power supply 20 of the computer main body 1 to the respective components of the computer main body 1 on the basis of the voltage (+15 V) from the power supply 52. In addition, the voltage (+5 V) from the power supply 20 is applied to the expansion unit 2 through the interface card 3.

In the interface card 3, the bus drivers 3a, 3d, 3f, and 3h, and the controller 3c are enabled by the voltage (+5 V) from the power supply 20.

When the voltage (+5 V) from the power supply 20 is detected by the voltage detector 51 of the expansion unit 2, an operation check signal is supplied to the power supply 52. In response to the operation check signal, the power supply controller 52b of the power supply 52 determines that the computer main body 1 is in an operative state. As a result, an operating voltage is applied to each component of the expansion unit 2. That is, when the expansion unit 2 receives the operation check signal, which is supplied upon detection of the voltage (+5 V) from the power supply 20 of the computer main body 1, through the interface card 3, the operating voltage can be applied to each component.

Of the operating voltages (+12 V, −12 V, +5 V, and −5 V) to be applied to the respective components, a predetermined operating voltage (+5 V) is applied to the interface card 3. In the interface card 3, the bus drivers 3b, 3e, 3g, and 3i are enabled by this operating voltage (+5 V).

With the above operation, power supply control at the start of the system is completed.

Selection processing of an I/O interface in a case wherein the expansion unit 2 is connected to the computer main body 1 will be described below.

Figure 4A:
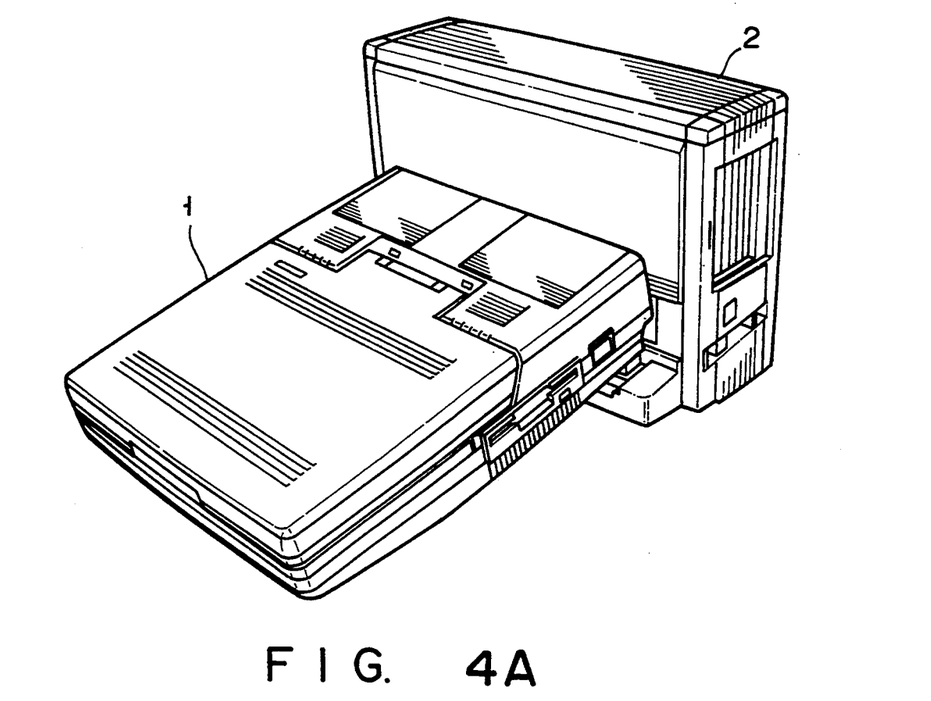
FIGS. 4A to 4C are views each showing an outer appearance of the computer system.
Figure 4B:
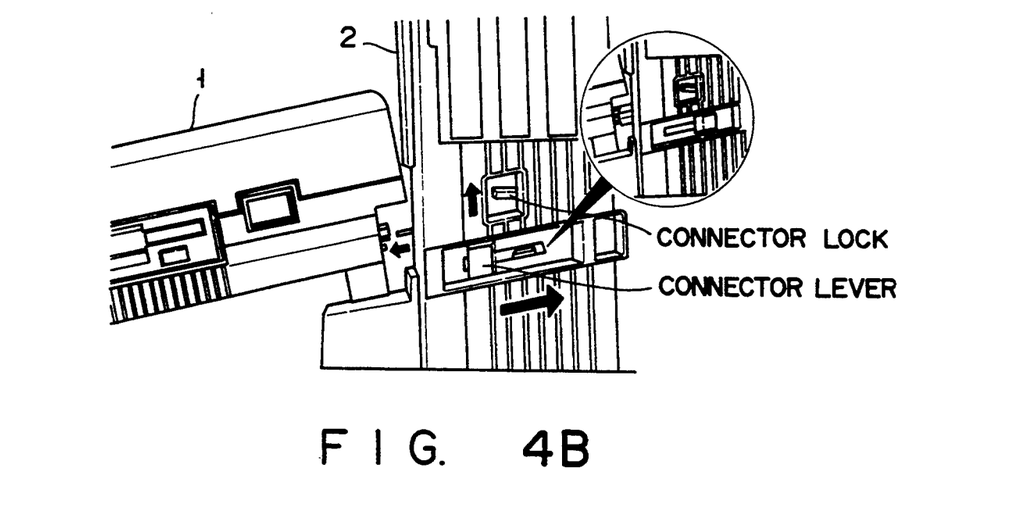
Figure 4C:
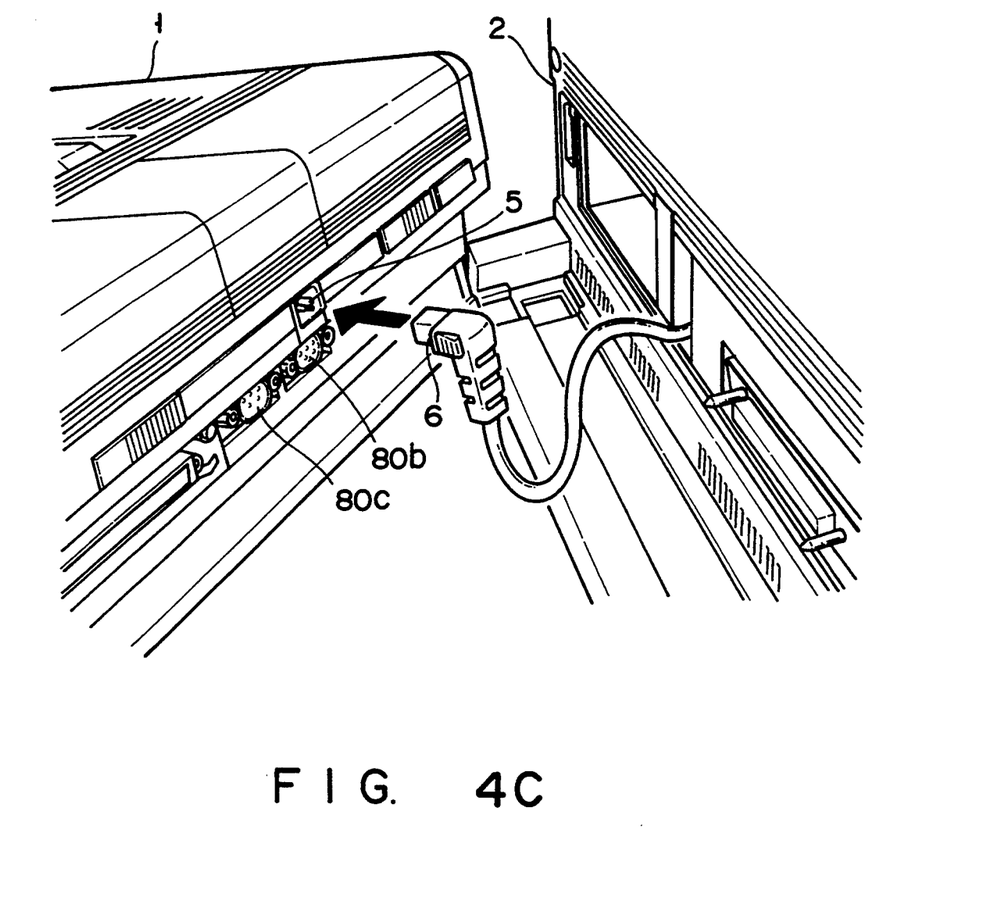

As shown in FIGS. 4A to 4C, when the expansion unit 2 is to be used, the expansion unit 2 is connected to the rear surface side of the computer main body 1. Since the connectors 80a, 80b, and 80c are arranged on the rear surface side of the computer main body 1, no other unit can be physically connected to the computer main body 1. Therefore, as shown in FIG. 4A to 4C, when the expansion unit 2 is connected to the computer main body 1, other units must be connected to the connectors 85a, 85b, and 85c in place of the connectors 80a, 80b, and 80c.

If the port addresses of the I/O ports of the I/O interfaces of the computer main body 1 and the expansion unit 2 are identical, an I/O interface to be used must be selected.

Figure 5:
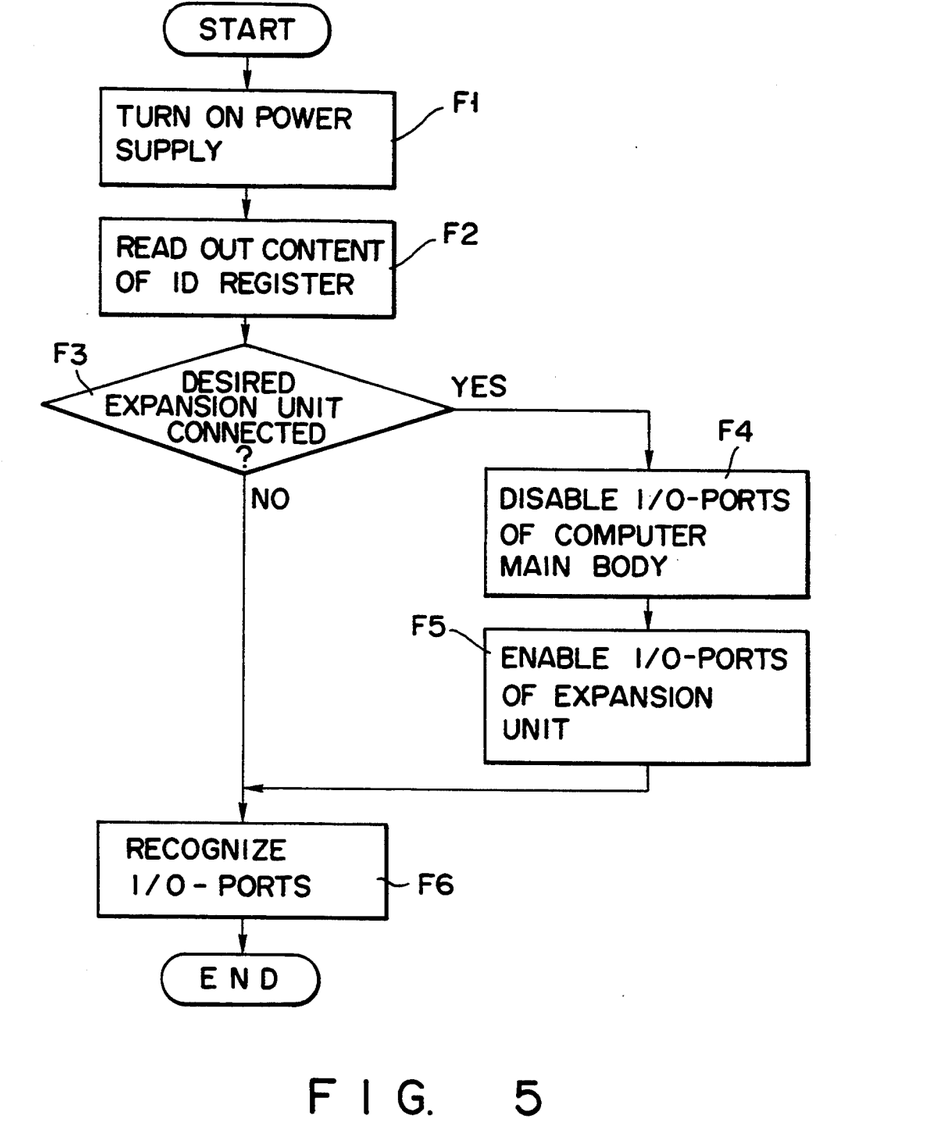
FIGS. 5 and 6 are flow charts for explaining I/O interface selection processing.

Selection processing of an I/O interface to be executed when the power supply is turned on will be described below with reference to a flow chart in FIG. 5.

When the expansion unit 2 is connected to the computer main body 1, the power supply is turned on in step F1. When the power supply is turned on, a storage content of the ID register 54 of the expansion unit 2 is read out (step F2).

In step F3, it is checked on the basis of the read content whether or not a desired expansion unit is connected.

If YES in step F3, the I/O ports 313, 324, and 334 of the interfaces 31, 32, and 33 are disabled (step F4). In addition, the I/O ports 613, 624, and 634 of the interfaces 61, 62, and 63 in the expansion unit 2 are enabled (step F5).

In step F6, an enable/disable state of each I/O port is recognized.

Figure 6:
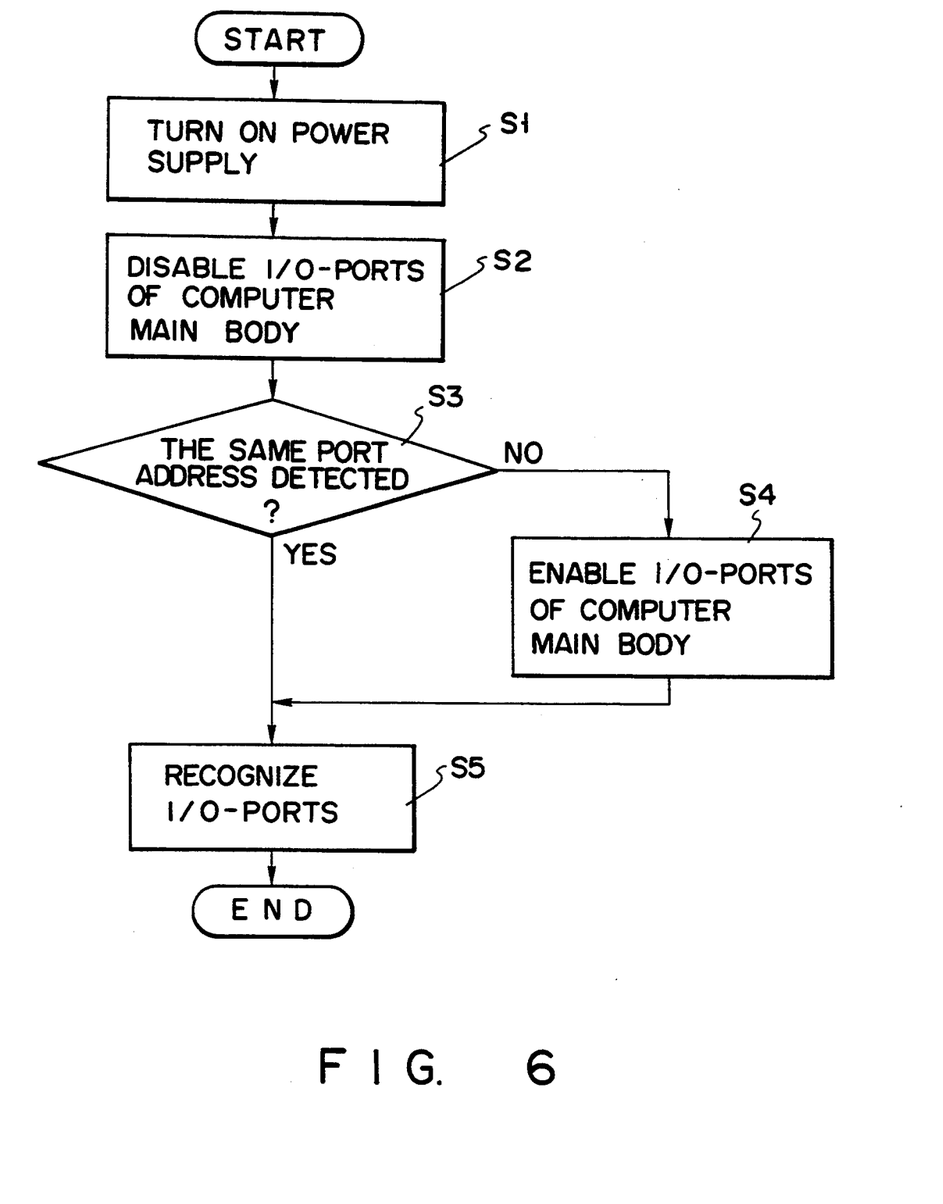

Note that selection processing of an I/O interface can be performed in accordance with a sequence shown in FIG. 6. More specifically, when the expansion unit 2 is connected to the computer main body 1, the power supply is turned on in step S1. When the power supply is turned on, the I/O ports 313, 324, 334 of the interfaces 31, 32, and 33 in the computer main body 1 are disabled (step S2).

In step S3, it is checked whether or not the expansion unit 2 includes an I/O interface having I/O ports with the same port address as each of the I/O ports 313, 324, and 334. That is, readout of port addresses is performed to the respective I/O ports.

If NO in step S3, the I/O ports 313, 324, and 334 of the interfaces 31, 32, and 33 are enabled (step S4).

In step S5, an enable/disable state of each I/O port is recognized.

As described above, when an expansion unit is to be connected to a computer main body, an operation error, a circuit breakdown, or the like which are caused when power supplies are turned on in an incorrect sequence can be prevented by performing power supply control as in the embodiment. In addition, if identical I/O port addresses are present on the same bus, an operation error of the computer system can be prevented by disabling the I/O ports of the respective I/O interfaces in the computer main body and enabling the I/O ports of the respective I/O interfaces in the expansion unit.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. Computer system comprising:
   a computer main body which has a plurality of main components and main power supply means for supplying a plurality of first operating voltages to the main components;
   an expansion unit which has a plurality of expansion components and expansion power supply means for supplying a plurality of second operating voltages to the expansion components, the expansion power supply means to which a power source voltage is supplied when the expansion unit is connected to the computer main body; and
   interface means for electrically connecting the expansion unit to the computer main body,
   wherein the expansion power supply means receives the power source voltage, supplies the power source voltage to the main power supply means through the interface means when the expansion power supply means is powered on and supplies the second operating voltages to the expansion components in accordance with the power source voltage when the expansion power supply means receives a check signal, one of the second operating voltages being supplied to the interface means, and
   the main power supply means, when the main power supply means is powered on and when the main power supply means receives the power source voltage from the expansion power supply means, supplies the first operating voltages to the main components in accordance with the power source voltage and supplies the check signal to the expansion power supply means through the interface means.

2. A system according to claim 1, wherein data transmission from the expansion unit to the computer main body is enabled by the interface means when the interface means receives the check signal, and data transmission from the computer main body to the expansion unit is enabled by the interface means when the interface means receives one of the second operating voltages.

3. A system according to claim 1, wherein data transmission from the expansion unit to the computer main body is disabled by the interface means until the main power supply means supplies the first operating voltages to the main components, and data transmission from the computer main body to the expansion unit is disabled by the interface means until the expansion power supply means supplies the second operating voltages to the expansion components.

4. A method for controlling a power supply in a computer main body which has a plurality of main components and a main power source and to which an expansion unit is connectable by an interface, the expansion unit which has a plurality of expansion components and an expansion power source to which a power source voltage is supplied when the expansion unit is connected to the computer main body, the method comprising the steps of:
   connecting the expansion unit to the computer main body;

receiving the power source voltage by the expansion power source;

supplying the power source voltage from the expansion power source to the main power source through the interface when the expansion power source is powered on;

supplying first operating voltages to the main components in accordance with the power source voltage when the main power source is powered on and when the main power source receives the power source voltage;

supplying a check signal corresponding to one of the first operating voltages to the expansion power source through the interface when the first operating voltages are supplied to the main components; and supplying the second operating voltages to the expansion components in accordance with the power source voltage when the expansion power source receives the check signal, one of the second operating voltages being supplied to the interface.

5. The method according to claim 4, wherein data transmission from the expansion unit to the computer main body is enabled by the interface when the interface receives the check signal, and data transmission from the computer main body to the expansion unit is enabled by the interface when the interface receives one of the second operating voltages.

6. The method according to claim 4, wherein data transmission from the expansion unit to the computer main body is disabled by the interface until the main power source supplies the first operating voltages to the main components, and data transmission from the computer main body to the expansion unit is disabled by the interface until the expansion power source supplies the second operating voltages to the expansion components.

7. A computer system comprising:

a portable computer including a first connector, a first component and a first power supply supplying a first operating voltage to the main component; and an expansion unit removably connected to the portable computer, and which includes a second connector adapted to be removably connected to the first connector so as to electrically couple the expansion unit and the portable computer, a second component and a second power supply supplying a operating voltage to the second component, the second power supply supplying a source voltage to the first power supply through the first and the second connectors when the first connector is connected to the second connector and the second power supply is powered on, wherein the first power supply supplies the first operating voltage to the first component and supplies a check signal representing that the portable Computer is in an operative state to the second power supply through the first and the second connectors when the source voltage is supplied to the first power supply and the first power supply is powered on, and the second power supply supplies the second operating voltage to the second component when the second power supply receives the check signal.

8. A computer system according to claim 7, wherein the first connector includes a first data connect portion and a first power connect portion, the second connector includes a second data connect portion removably connected to the first data connect portion and a second power connect portion removably connected to the first power connect portion, the source voltage is supplied through the first and the second power connect portions, the check signal is supplied through the first and second data connect portions.

9. A computer system according to claim 7, wherein the check signal is a branch signal branched from the first operating voltage.

10. A computer system comprising:

a portable computer including a first connector, a first power terminal, a first component and a first power supply supplying a first operating voltage to the first component;

an interface card including a second connector electrically connected to the first connector and a third connector electrically connected to the second connector; and an expansion unit removably connected to the portable computer, including a fourth connector removably connected to the third connector so as to electrically coupling the expansion unit and the portable computer through the first, the second, the third and the fourth connectors, a second power terminal removably connected to the first power terminal, a second component and a second power supply supplying a second operating voltage to the second component, the second power supply supplying a source voltage to the first power supply through the first and the second power terminals when the first power terminal is connected to the second power terminal and the second power supply is powered on, wherein the first power supply supplies the first operating voltage to the first component and supplies the first operating voltage to the second power supply through the first, the second, the third and fourth connectors when the source voltage is supplied to the first power supply and the first power is powered on, and the second power supply supplies the second operating voltage to the second component when the second power supply receives the first operating voltage.

11. A computer system according to claim 10, wherein the interface card includes a bus controller, the bus controller is enabled when the first operating voltage is supplied from the first power supply through the first and the second connectors.

12. A computer system according to claim 10, wherein the interface card includes a first bus driver for transmitting data from the portable computer to the expansion unit and a second bus driver for transmitting data from the expansion unit to the portable computer, the first bus driver is enabled when the second operating voltage is supplied from the second power supply through the third and the fourth connectors, the second bus driver is enabled when the first operating voltage is supplied from the first power supply through the first and the second connectors.

13. A method for controlling a power supply in a computer system comprising a portable computer including a first connector, a first component and a first power supply supplying a first operating voltage, and an expansion unit removably connected to the portable computer, and which includes a second connector adapted to be removably connected to the first connector so as to electrically couple the expansion unit and the portable computer, a second component and a second power supply supplying a second operating voltage and a source voltage, the method comprising the steps of:

connecting the expansion unit to the portable computer;

enabling the second power supply;

supplying the source voltage from the second power supply to the first power supply through the first and the second connectors;

enabling the first power supply;

supplying the first operating voltage from the first power supply to the first component when the source voltage is supplied to the first power supply;

supplying a check signal representing that the portable computer is in an operative state from the first power supply to the second power supply when the first operating voltage is supplied from the first power supply; and supplying a second operating voltage from the second power supply to the second component when the first power supply supplies the check signal to the second power supply.

14. A portable computer removably connected to an expansion unit, the expansion unit including a first connector, a first component, and a first power supply supplying a first operating voltage to the first component, the first power supply outputting a source voltage to the portable computer, the portable computer comprising:

a second component;

a second connector removably connected to the first connector so as to electrically couple the portable computer and the expansion unit; and a second power supply supplying a second voltage to the second component and a check signal representing that the portable computer is in an operative state to the first power supply through the first and the second connectors when the source voltage is supplied from the first power supply and the second power supply is powered on, wherein the first power supply supplies the first operating voltage to the first component when the check signal is supplied from the second power supply.

15. A portable computer according to claim 14 further comprising an interface portion to which the second connector is disposed.

16. A portable computer according to claim 15, wherein the interface portion includes a bus controller therein, the bus controller is enabled when the check signal is supplied from the second power supply.

17. A portable computer according to claim 15, wherein the interface portion includes a first bus driver for transmitting data from the portable computer to the expansion unit, and a second bus driver for transmitting data from the expansion unit to the portable computer, the first bus driver is enabled when the first operating voltage is supplied from the first power supply and the second bus driver is enabled when the second operating voltage is supplied from the second power supply.

* * * * *